(12) United States Patent
Zhang et al.

(10) Patent No.: US 8,810,450 B2
(45) Date of Patent: Aug. 19, 2014

(54) GLOBAL POSITIONING SYSTEM RECEIVER TIMELINE MANAGEMENT

(75) Inventors: Gengsheng Zhang, Cupertino, CA (US); Quingwen Zhang, Irvine, CA (US); Paul Underbrink, Lake Forest, CA (US)

(73) Assignee: CSR Technology Inc., San Jose, CA (US)

( * ) Notice: Subject to any disclaimer, the term of this patent is extended or adjusted under 35 U.S.C. 154(b) by 142 days.

(21) Appl. No.: 13/435,687

(22) Filed: Mar. 30, 2012

(65) Prior Publication Data

US 2012/0188127 A1   Jul. 26, 2012

Related U.S. Application Data

(63) Continuation of application No. 12/091,798, filed as application No. PCT/US2006/042242 on Oct. 28, 2006, now Pat. No. 8,164,517, which is a continuation-in-part of application No. 10/570,578, filed on Aug. 25, 2008, now Pat. No. 8,013,787, said application No. 12/091,798 is a continuation-in-part of application No. 10/570,833, filed on Oct. 5, 2009, now Pat. No. 8,138,972.

(51) Int. Cl.
*G01S 19/37* (2010.01)
*G01S 19/03* (2010.01)
*G01S 19/05* (2010.01)

(52) U.S. Cl.
CPC *G01S 19/05* (2013.01); *G01S 19/37* (2013.01)
USPC .................... 342/357.77; 342/357.4

(58) Field of Classification Search
USPC ............... 342/357.4, 357.46, 357.68, 357.69, 342/357.77; 701/468, 470
See application file for complete search history.

(56) References Cited

U.S. PATENT DOCUMENTS

| | | | |
|---|---|---|---|
| 4,426,712 A | 1/1984 | Gorski-Popiel |
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |

(Continued)

FOREIGN PATENT DOCUMENTS

EP  0511741  11/1992
GB  2115195  1/1983

(Continued)

OTHER PUBLICATIONS

Soliman et al., GPS One: A Hybrid Position Location System, 2000 IEEE, pp. 334-335.

(Continued)

*Primary Examiner* — Dao Phan
(74) *Attorney, Agent, or Firm* — RatnerPrestia

(57) ABSTRACT

Satellite positioning system (SATPS) receiver that has a plurality of modes and channels, where a timeline module configures the channels based on the mode of operation of the SATPS receiver and reconfigures the channels if the mode of operation of the SATPS changes.

16 Claims, 7 Drawing Sheets

(56) References Cited

U.S. PATENT DOCUMENTS

| | | |
|---|---|---|
| 4,998,111 A | 3/1991 | Ma et al. |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,202,829 A | 4/1993 | Geier |
| 5,225,842 A | 7/1993 | Brown et al. |
| 5,257,195 A | 10/1993 | Hirata |
| 5,293,170 A | 3/1994 | Lorenz et al. |
| 5,311,195 A | 5/1994 | Mathis et al. |
| 5,323,164 A | 6/1994 | Endo |
| 5,343,209 A | 8/1994 | Sennott et al. |
| 5,345,244 A | 9/1994 | Gildea et al. |
| 5,347,284 A | 9/1994 | Volpi et al. |
| 5,347,536 A | 9/1994 | Meehan |
| 5,379,224 A | 1/1995 | Brown et al. |
| 5,402,347 A | 3/1995 | McBurney et al. |
| 5,402,441 A | 3/1995 | Washizu et al. |
| 5,416,712 A | 5/1995 | Geier et al. |
| 5,420,593 A | 5/1995 | Niles |
| 5,440,313 A | 8/1995 | Osterdock et al. |
| 5,450,344 A | 9/1995 | Woo et al. |
| 5,504,684 A | 4/1996 | Lau et al. |
| 5,535,278 A | 7/1996 | Cahn et al. |
| 5,592,173 A | 1/1997 | Lau et al. |
| 5,625,668 A | 4/1997 | Loomis et al. |
| 5,663,734 A | 9/1997 | Krasner |
| 5,663,735 A | 9/1997 | Eshenbach |
| 5,781,156 A | 7/1998 | Krasner |
| 5,786,789 A | 7/1998 | Janky |
| 5,812,087 A | 9/1998 | Krasner |
| 5,825,327 A | 10/1998 | Krasner |
| 5,828,694 A | 10/1998 | Schipper |
| 5,831,574 A | 11/1998 | Krasner |
| 5,841,396 A | 11/1998 | Krasner |
| 5,845,203 A | 12/1998 | LaDue |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | LaDue |
| 5,903,654 A | 5/1999 | Milton et al. |
| 5,907,578 A | 5/1999 | Pon et al. |
| 5,907,809 A | 5/1999 | Molnar et al. |
| 5,917,444 A | 6/1999 | Loomis et al. |
| 5,920,283 A | 7/1999 | Shaheen et al. |
| 5,923,703 A | 7/1999 | Pon et al. |
| 5,926,131 A | 7/1999 | Sakumoto et al. |
| 5,936,572 A | 8/1999 | Loomis et al. |
| 5,943,363 A | 8/1999 | Hanson et al. |
| 5,945,944 A | 8/1999 | Krasner |
| 5,963,582 A | 10/1999 | Stansell, Jr. |
| 5,966,403 A | 10/1999 | Pon |
| 5,977,909 A | 11/1999 | Harrison et al. |
| 5,982,324 A | 11/1999 | Watters et al. |
| 5,987,016 A | 11/1999 | He |
| 5,999,124 A | 12/1999 | Sheynblat |
| 6,002,362 A | 12/1999 | Gudat |
| 6,002,363 A | 12/1999 | Krasner |
| 6,009,551 A | 12/1999 | Sheynblat |
| 6,016,119 A | 1/2000 | Krasner |
| 6,040,798 A | 3/2000 | Kinal et al. |
| 6,041,222 A | 3/2000 | Horton et al. |
| 6,047,017 A | 4/2000 | Cahn et al. |
| 6,052,081 A | 4/2000 | Krasner |
| 6,061,018 A | 5/2000 | Sheynblat |
| 6,064,336 A | 5/2000 | Krasner |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd et al. |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,178,195 B1 | 1/2001 | Durboraw, III et al. |
| 6,236,354 B1 | 5/2001 | Krasner |
| 6,252,542 B1 | 6/2001 | Sikina et al. |
| 6,313,786 B1 | 11/2001 | Sheynblat et al. |
| 6,327,473 B1 | 12/2001 | Soliman et al. |
| 6,389,291 B1 | 5/2002 | Pande et al. |
| 6,414,987 B1 | 7/2002 | Pon |
| 6,466,612 B2 | 10/2002 | Kohli et al. |
| 6,529,829 B2 | 3/2003 | Turetzky et al. |
| 6,633,255 B2 | 10/2003 | Krasner |
| 6,650,694 B1 | 11/2003 | Brown et al. |
| 6,684,158 B1 | 1/2004 | Garin et al. |
| 6,707,423 B2 | 3/2004 | Turetzky et al. |
| 6,873,288 B2 | 3/2005 | Heppe |
| 2002/0064209 A1 | 5/2002 | Turetzky et al. |
| 2002/0142783 A1 | 10/2002 | Yoldi |
| 2003/0104818 A1 | 6/2003 | Kotzin |
| 2003/0154025 A1 | 8/2003 | Fuchs |
| 2003/0176204 A1 | 9/2003 | Abraham |
| 2004/0130484 A1 | 7/2004 | Krasner |
| 2012/0198181 A1 | 8/2012 | Das et al. |

FOREIGN PATENT DOCUMENTS

| | | |
|---|---|---|
| GB | 2335554 | 9/1999 |
| JP | 58-105632 | 6/1983 |
| JP | 7-36035 | 5/1986 |
| JP | 4-326079 | 11/1992 |
| WO | WO 90/11652 | 10/1990 |
| WO | WO 02/04975 | 7/2000 |
| WO | WO 00/45191 | 8/2000 |
| WO | WO 03/098258 | 5/2002 |
| WO | WO 2005/022187 | 3/2005 |

OTHER PUBLICATIONS

Van Nee, D.J.R. Coenen, A.J.R.M., "New Fast GPS Code-Acquisition Using FFT," Electronic Letters, vol. 27, No. 2, pp. 158-160 (1991).

Van Nee, D.J.R., Coenen, A.J.R.M., "Novel Fast GPS/GLONASS Code Acquisition Technique Using Low Update Rate RRT," Electronic Letters, vol. 28, No. 9, pp. 863-865 (1992).

Office Action for U.S. Appl. No. 12/091,798, filed Oct. 10, 2008, mailed Sep. 9, 2010.

Office Action for U.S. Appl. No. 13/193,863, filed Jul. 29, 2011, dated May 8 2014.

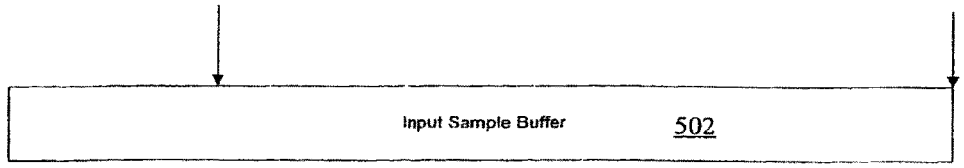
FIG. 5
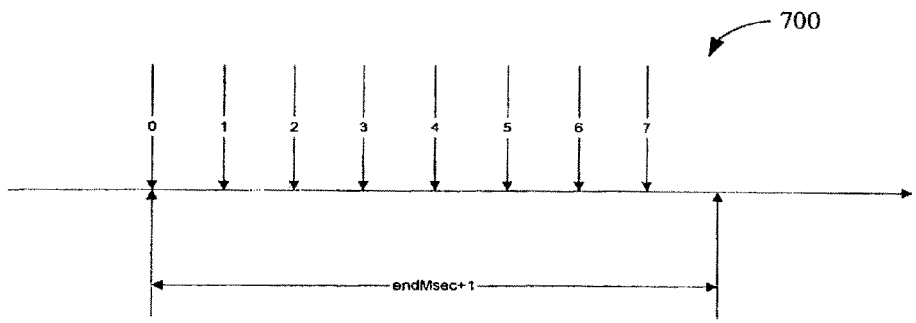
FIG. 6
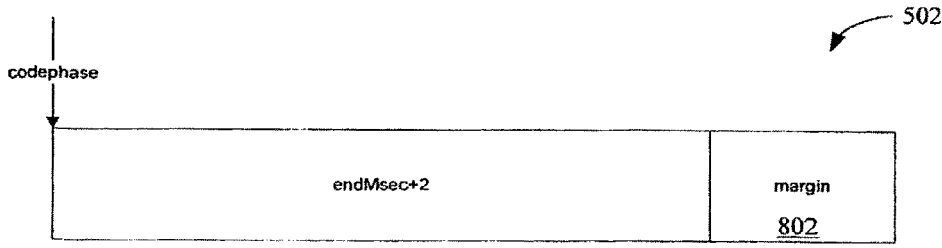
FIG. 7
FIG. 8

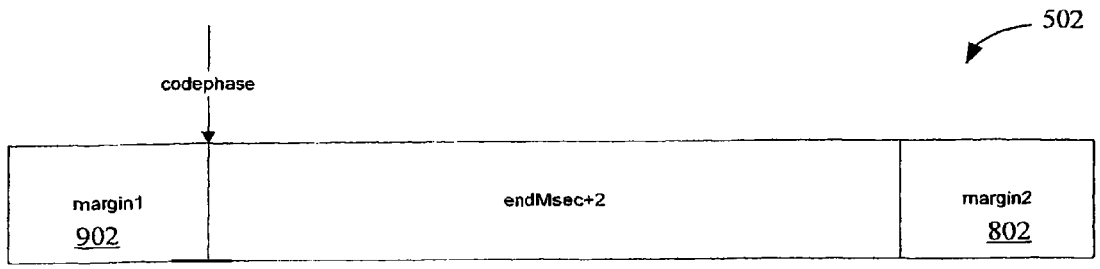

FIG. 9

| Type of Alignment | Description |
|---|---|
| NO_ALIGNMENT 1002 | No alignment is required when the full C/A code search is performed and the search does not require NAV bit alignment. The *codePhase* can be set to any arbitrary value. |
| 1MS_ALIGNMENT 1004 | One millisecond alignment is required when the partial C/A code search is performed and the search does not require NAV bit alignment. The *codePhase* can only be the desired code phase plus an integer multiple of milliseconds. |
| PDI_ALIGNMENT 1006 | PDI millisecond alignment is required when the search requires NAV bit alignment and PDI is less than 20 ms. The PDI is also a factor of 20 ms. The *codePhase* can only be the desired code phase plus an integer multiple of PDI milliseconds. |
| 20MS_ALIGNMENT 1008 | Twenty millisecond alignment is required when the search requires NAV bit alignment and PDI is equal to or an integer multiple of 20 ms. The *codePhase* can only be the desired code phase plus an integer multiple of 20 milliseconds. |
| NAVBIT_ALIGNMENT 1010 | Integer multiple of NAV bits alignment is required when NAV Bit Aiding is performed. The codePhase can only be the desired codePhase plus an integer multiple of NAV bits. The desired codePhase needs to be aligned up with a given bit number. |

FIG. 10

GLOBAL POSITIONING SYSTEM RECEIVER TIMELINE MANAGEMENT

RELATED APPLICATIONS

This application is a continuation of patent application Ser. No. 12/091,798, filed Oct. 10, 2008, and titled GLOBAL POSITIONING SYSTEM RECEIVER TIMELINE MANAGEMENT which claims priority to PCT Patent Application No. PCT/US2006/042242, filed Oct. 28, 2006, titled GLOBAL POSITIONING SYSTEM RECEIVER TIMELINE MANAGEMENT which is a continuation in part of patent application Ser. No. 10/570,578, filed on Mar. 1, 2006, and titled "CONTROL AND FEATURES FOR SATELLITE POSITIONING SYSTEM RECEIVERS", that claimed priority to PCT Patent Application No. PCT/US2004/028542, filed on Sep. 2, 2004, and titled "CONTROL AND FEATURES FOR SATELLITE POSITIONING SYSTEM RECEIVERS", that claimed priority to U.S. Provisional Patent Application No. 60/546,816, filed on Feb. 23, 2004, U.S. Provisional Application No. 60/547,385, filed on Feb. 23, 2004, and U.S. Provisional Patent Application No. 60/499,961, filed on Sep. 2, 2003; and is a continuation in part of U.S. patent application Ser. No. 10/570,833, filed on Mar. 1, 2006, and titled "SIGNAL PROCESSING SYSTEM FOR SATELLITE POSITIONING SIGNALS", that claimed priority to PCT Patent Application No. PCT/US2004/028926, filed on Sep. 2, 2004, and titled "SIGNAL PROCESSING SYSTEM FOR SATELLITE POSITIONING SIGNALS", that claimed priority to U.S. Provisional Patent Application No. 60/546,816, filed on Feb. 23, 2004, U.S. Provisional Patent Application No. 60/547,385, filed on Feb. 23, 2004, and U.S. Provisional Patent application No. 60/499,961, filed on Sep. 2, 2003; and claims priority to U.S. Provisional Application No. 60/731,208, filed on Oct. 28, 2005, with all applications being incorporated by reference herein.

BACKGROUND OF THE INVENTION

1. Field of the Invention

This invention relates generally to Satellite Positioning Systems (SATPS) and in particular to timeline management of channels within a SATPS receiver.

2. Related Art

SATPS were created using standalone receivers to aid with navigation. SATPS receivers have become commonplace and have been connected to and incorporated in a number of different wireless devices, such as cellular telephones, Personal Communication System (PCS) receivers, Personal Digital Assistants (PDA), and wired devices such as a Personal Computer (PC). Traditionally, SATPS have had a predetermined fixed number of independent channels used to process CDMA data.

The fixed number of independent channels is wasteful of resources when a SATPS receiver has different modes of operation. The fixed number of independent channels often results in periods where the fixed number of independent channels are not required or the fixed size of the channel results in wasted processing and leads to power being wasted in the SATPS receiver. The fixed number of independent channels also requires complex processing to increase the efficiency of accessing and processing the SATPS data contained in the different independent channels. Thus, the fixed number of independent channels approach is wasteful of power and processing resources.

Therefore, there is a need for an approach to implementing a SATPS receiver that makes more efficient use of resources and power that overcomes the disadvantages set forth above and others previously experienced.

SUMMARY

Systems consistent with the present invention enable a SATPS signal processor or a controller acting as a SATPS signal processor to employ a single-signal processing pipeline that may be time multiplexed among a number of channels. The single-signal processing pipeline enables continuous processing of data and may be achieved with a circular data structure of channel records associated with each of the channels that may be processed by the SATPS signal processor or the controller acting as the SATPS signal processor. The SATPS signal processor or other controller enables the assignment and configuration of channels for satellite acquisition, verification, bit synchronization, or tracking satellites by configuration of the sequencing and control of a timeline managed by a timeline manager module. The optimization of the timeline occurs by the SATPS signal processor or other controller acting as a SATPS signal processor having a code phase value for the running channels set up and maintained by the timeline manager module. The timeline manager module may be a hardware device running software, or a software process being executed within the hardware of the SATPS signal processor or the controller acting as a SATPS signal processor.

Other systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 5 illustrates a diagram of a continuous 32-bit input sample buffer in the RAM of FIG. 3.

FIG. 6 illustrates a table of Fast Fourier Transfer Modes used by the FFT subsystem of FIG. 3.

FIG. 7 illustrates an ideal timeline for channel processing of FIG. 4.

FIG. 8 illustrates the input sample buffer of FIG. 5 with an additional margin portion at the end of the input sample buffer.

FIG. 9 illustrates the input sample buffer of FIG. 6 with an additional margin portion at the beginning of the input sample buffer.

FIG. 10 is a chart that illustrates the five types of channel alignment.

DETAILED DESCRIPTION

The discussion below is directed to a hardware and software architecture that provides control and features in a receiver for use in satellite positioning systems (SATPS), such as the United States Global Positioning Satellite System commonly referred to as a GPS system. Specific features of the architecture of a SATPS receiver include, as examples: initialization of memory; control of data processing; subsystem communication; power control management, and an expert system receiver manager. The SATPS receiver may have a timeline manager module that is responsible for setting up channels used by a SATPS signal processor and fast Fourier transfer (FFT) processor, while minimizing stall time. The architecture and features of the SATPS receiver described below are not limited to the precise implementations described, but may vary from system to system according to the particular needs or design constraints of those SATPS receivers.

Figure 1:
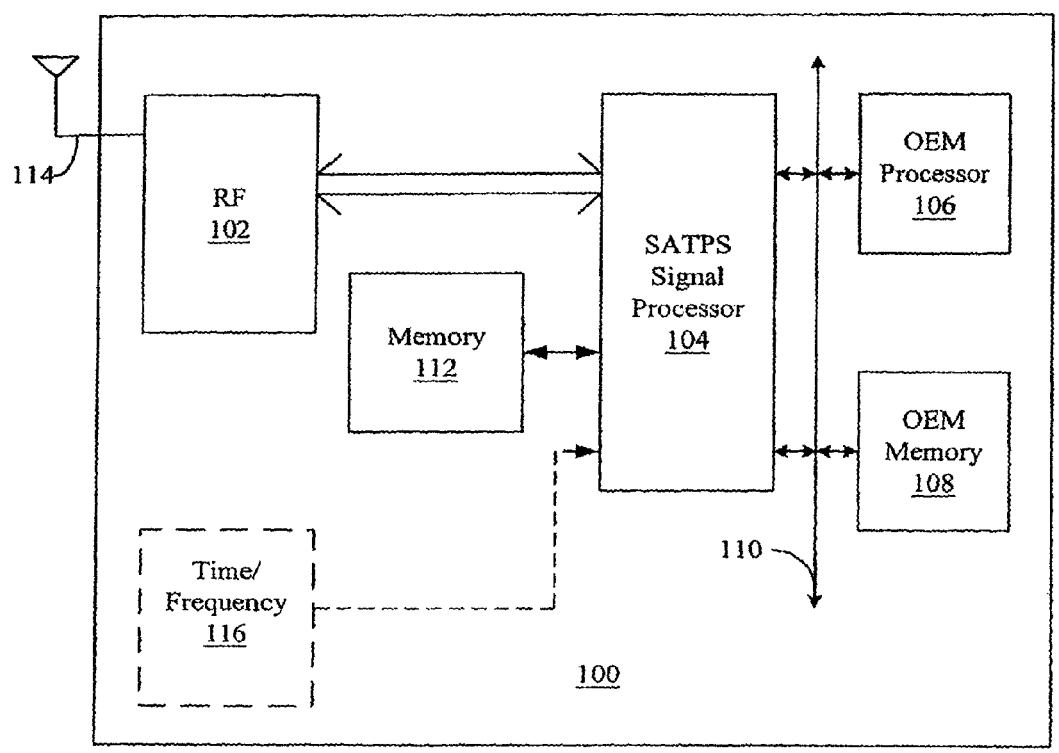
FIG. 1 illustrates a block diagram of an embodiment of a SATPS receiver.

Turning to FIG. 1, a block diagram of an embodiment of a SATPS receiver 100, including a radio frequency ("RF") component 102 and a SATPS signal processor (baseband component) 104. In one embodiment, the RF component 102 and the SATPS signal processor 104 may interface with additional functionality provided by an original equipment manufacturer ("OEM") subsystem, or "host" processor 106 and OEM memory 108 over a bus 110. As will be described below, the SATPS signal processor 104 may communicate with a memory component 112. The memory component 112 may be separate from the SATPS signal processor 104. In other implementations the memory component 112 may be implemented within the SATPS signal processor 104. The RF component 102 may be directly coupled to an antenna 114 and dedicated to the RF component 102. In other implementations, the antenna 114 may be shared by the RF component 102 and an OEM receiver (not shown). Optionally, the OEM memory 108 may be separate from the memory component 112 and independent from the baseband component 104. Other possible arrangements may include one or more RF components and one or more baseband components being on one or more chips with all of the required memory and processing power to perform the SATPS functions. In yet other implementations, multiple chips may be used to implement the SATPS receiver 100 and may be combined with technology such as flip-chip packaging.

The SATPS receiver 100 may also have a time/frequency component 116. The time/frequency component 116 may provide timing for tracking loops and real time clocks that function during power control conditions. The time/frequency component may be implemented as a real time clock and/or numerically controlled oscillators. The time/frequency component 116 may be in direct or indirect communication with the SATPS signal processor 104.

The SATPS receiver 100 may operate without aiding information, or alternatively, it may operate with aiding information from a variety of sources and have additional hardware circuitry and software to communicate with a communication network or communicate with another network via the OEM processor 106. The communication may be implemented using standards, such as those adopted by the Institute of Electrical Engineers, International Standards Organization, or Cellular communication standards, or by using a proprietary communication approach. Furthermore, the SATPS signal processor 104 may also include such circuitry as a digital signal processor ("DSP"), an ARM processor, clock components, various memory components, various interface components for external and internal communication, etc.

Figure 2:
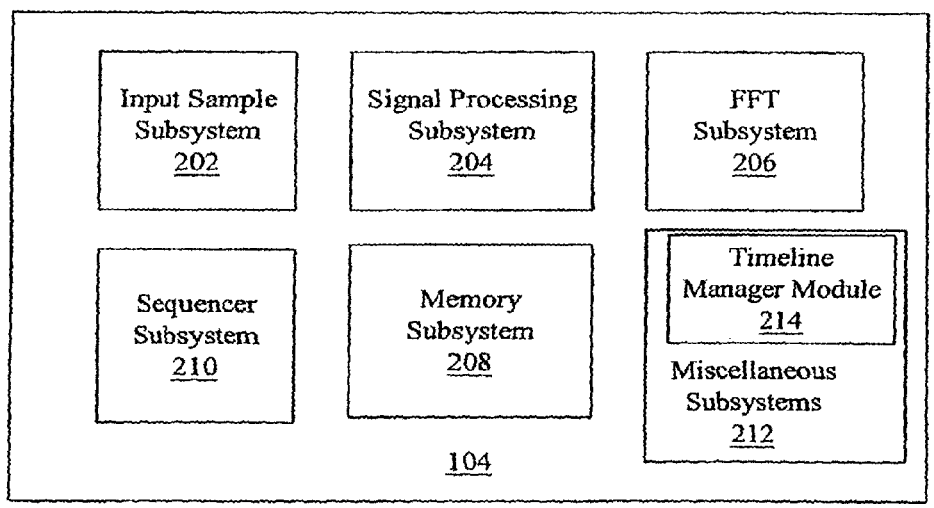
FIG. 2 is a block diagram showing subsystems of a SATPS signal processor (baseband chip) from the SATPS receiver of FIG. 1, one of which has a timeline manager module.

In FIG. 2, a block diagram shows subsystems of an embodiment of the SATPS signal processor (baseband chip) 104 from the SATPS receiver 100 of FIG. 1, one of which subsystems includes a timeline manger module 214. The SATPS signal processor 104 may include an input sample subsystem 202, a signal processing subsystem 204, a FFT subsystem 206, a memory subsystem 208, a sequencer subsystem 210, and other "miscellaneous" subsystems 212. One of the miscellaneous subsystems 212 may be a timeline manager module 214. For convenience herein, the subsystems may be referred to as groups of processes or tasks implemented along with associated hardware. The division of tasks or functionality between the subsystems typically is determined by design choice.

In different implementations, the different subsystems may share functionalities in different ways, or there may be more or less subsystems. For example, in some implementations the sequencer subsystem 210 may not be a separate subsystem. Rather a part of the sequencer functionality may reside in one subsystem while the remaining functionality resides in another subsystem.

The input sample subsystem 202 receives signal data from the RF component 102, FIG. 1, and stores the signal data in RAM that may be part of the memory subsystem 208, FIG. 2. Raw digitized signal data or minimally processed decimated signal data may also be stored in RAM. The ability to store the digitized RF signals may occur in one of two approaches. The first approach is for the data to be gathered by the input sample subsystem 202 in increments of 20 milliseconds and stored in RAM with the process being repeated over and over. The other approach is for the input sample subsystem 202 to use a cyclic buffer in RAM.

For example, the input sample subsystem 202 may fill a region of the RAM and then overwrite the data upon cycling through the buffers. Such an operational approach would have the software set up the signal processing subsystem 204 and the FFT subsystem 206 in such a way to process the signal data fast enough before the signal data is overwritten in the cyclic buffer. The operational approach may be selectable with the software configuring the approach that best meets the needs of the user and the RF environment upon the SATPS system 100 being initialized. In other embodiments, the operational approach used by the input sample subsystem 202 may be changed during operation of the SATPS receiver 100.

The memory subsystem 208 manages the memory resources of the SATPS receiver 100. A single memory area may be subdivided into different types of memory areas. Examples of the subdivided memory areas may include input sample memory, coherent buffers, cross-correlated memory, non-coherent buffers, channels state, track history, and report memory. The input sample memory may also be subdivided further into channels with the signal processing subsystem 204 and FFT subsystem 206 accessing different channels with context switching between the channels.

The miscellaneous subsystems 212 may include hardware and software for implementing a convolutional decoder for WAAS aiding data. The miscellaneous subsystems 212 may use data from the memory subsystem 208 and may provide information to other subsystems by writing into the channel state RAM area or other control/status areas in the memory subsystem 208. A timeline manager module 214 may also be implemented in the miscellaneous subsystem 212 in hardware, software or a combination of hardware and software and manage the time line and configuration of the SATPS data contained in the multiple channels that are accessed by the signal processing subsystem 204 and FFT subsystem 206.

Figure 3:
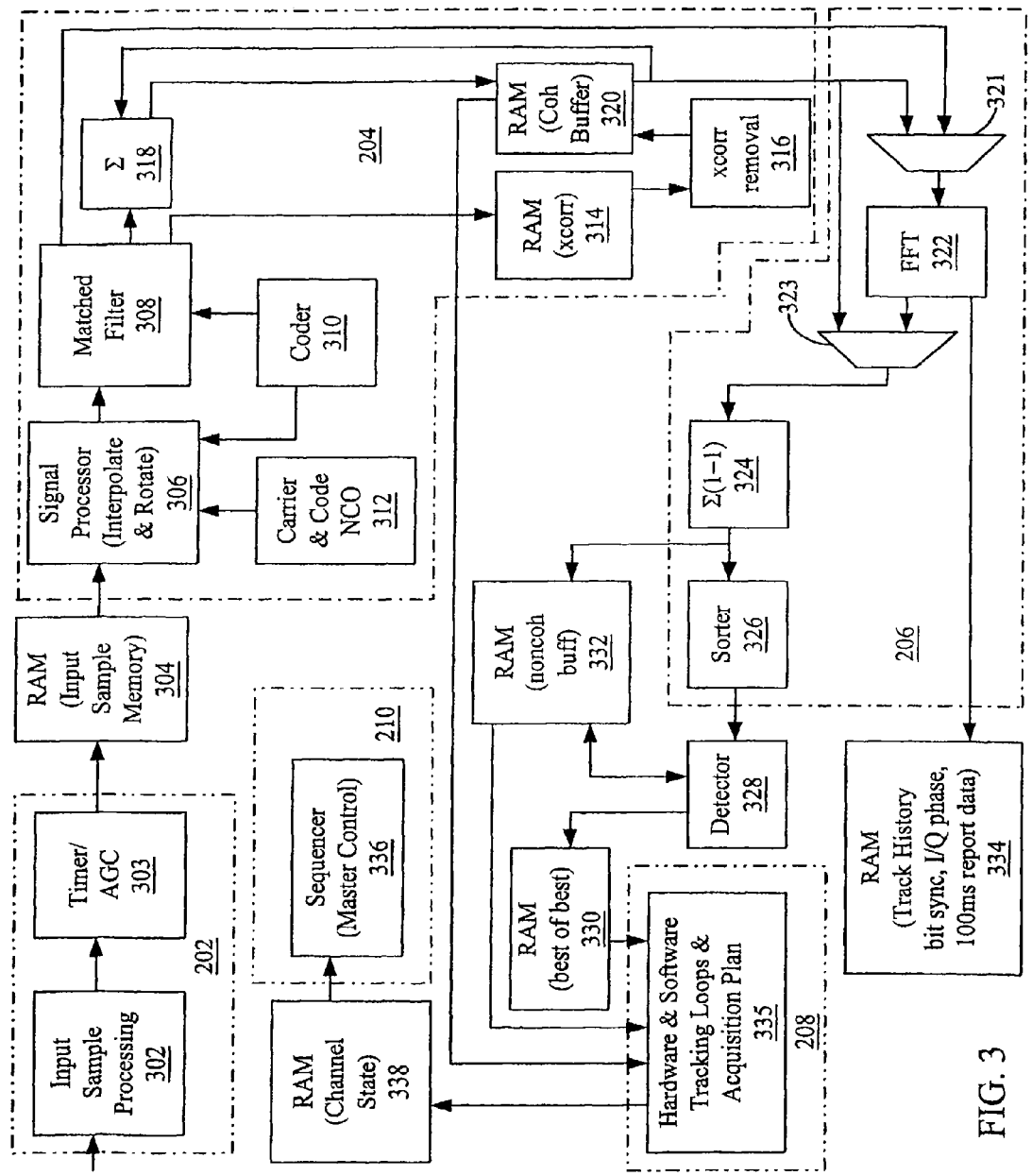
FIG. 3 is a block diagram illustrating general data flow between subsystems of the SATPS receiver of FIG. 1.

Turning to FIG. 3, a diagram of signal flow between the subsystems of the SATPS receiver 100 of FIG. 1 is shown. An RF signal, such as a CDMA SATPS satellite signal, is received by the RF component 102, FIG. 1, and passed to the input sample processing subsystem 202, FIG. 3. The input sample processing subsystem 202 may include an input sample processing block 302 and a Timer/Automatic Gain Control (AGC) block 303. The Timer/AGC block 303 is made up of a number of counters, timers, and alarm generators that are used to sample input pulses of the input signal. The Timer/AGC block 303 may also create interrupts, start software and hardware functions at known times as well as conducting synchronization, and frequency and phase measurement. The Timer/AGC block 303 may provide the ability to synchronize two systems or subsystems by generating precision time alignment pulses or by accepting input pulses from other systems in addition to making relative frequency and phase measurements. For example, in systems having a low power real-time (RTC) clock with a low cost watch-type crystal, the watch-type crystal may be calibrated to SATPS time by the Timer/AGC block 303 in order to use the low cost low power RTC during power control conditions.

The input signal may be divided into digital samples in the input sample processing subsystem 202 with the output being stored in random access (RAM) memory 304. The RAM memory 304 may be any type of read/write memory that may be written to and read from at a rate to keep data flowing between the input sample subsystem 202 and the signal processing subsystem 204. The signal processing subsystem 204 may have a signal processor 306 that interpolates and rotates the received signals from RAM memory 304.

The signal processor 306 may be used to remove the carrier Doppler and code Doppler from the received signals before the received signals are further processed and filtered. The signal processor 306 may be reconfigurable to operate in a variety of different sampling and decimation modes. In the highest performance mode, for example, the signal processor 306 may use sixteen samples per chip input and produce eight phase samples per chip output. In another mode, the signal processor 306 may have four samples per chip input that may be interpolated to sixteen samples per chip by repeat sampling and filtering to produce better code phase output while reducing loss that typically occurs at low sampling rates. The modes of the signal processor 306 may be software controlled via parameters that are passed into the signal processor through the channel RAM.

Thus, the signal processor 306 extracts the input samples from the RAM memory 304 and prepares them for use by the matched filter 308. Depending on the mode of the matched filter 308 the input samples will be interpolated and/or decimated to the correct sampling rate for the matched filter 308. For example, if the input samples are stored at $8f_0$ and the matched filter mode warrants using samples at $2f_0$, the signal processor 306 will decimate the input sample stream to $2f_0$. This provides additional flexibility in using various matched filter modes for various channel/satellite vehicle processing. The signal processor 306 may also rotate the complex input samples to remove the residual carrier Doppler from the signals and may be accomplished using the carrier NCO and code NCO outputs in conjunction with the input sample stream.

The signal processor subsystem 204 may also include a matched filter 308, coder 310, carrier and code numeric coded oscillator (NCO) 312, cross-correlator block 314, cross-correlation removal block 316, and a coherent summation block 318. The signal is processed and specific satellite signals identified. The carrier and code NCO 312 generates the pure carrier and code signals for use by the signal processor 306. The carrier and code NCO 312 may include programmable oscillators that may use counters to implement. The use of independent carrier and code NCOs for various channel/satellite vehicle processing provides flexibility for supporting the different types of processing modes in the SATPS receiver 100.

The carrier and code NCO 312 enables a carrier to code transfer that does not require multiplication steps. Typically carrier to code aiding is done with limited resolution multipliers. The carrier and code phase transfers may be accomplished with an accumulated remainder without any error between carrier and code phase. It enables very narrow code loop bandwidths without the slippage or drift between the carrier and code phase as found in implementations that use limited resolution multipliers. The code phase is locked to the carrier and small adjustments may be made to the code phase relative to the carrier. By keeping track of the adjustments, a full resolution carrier and code phase may be reconstructed from fewer bits and flip-flops than other known methods.

The matched filter 308 may be configurable for various precision levels and code phase fractions. The SATPS code is 1023 chips long and the match filter 308 may process or despread a full millisecond of the SATPS code when operating in a full mode. In another mode, four subdivisions may be fed into the FFT to improve the frequency range or bandwidth searched per correlation. Yet, other modes may double the number of chips by dividing the chips. Thus, a tradeoff may be made between a fractional division in order to double the precision of the data that is correlated. The mode of the match filter 308 may be controlled and configured by the software depending on the operation mode and the power control setting of the SATPS receiver 100.

For example, if the SATPS receiver 100 has information that only a fraction of the code chips need to be searched or tracked, the matched filter 308 may be set in half mode or a smaller mode. Such configuration will enable the use of smaller amounts of memory and result in a lower throughput data rate for the matched filter 308 and its outputs. On the other hand, if the entire code phase needs to be searched, the matched filter 308 may be configured in a full mode making full use of processing power. The use of programmable T1 epochs allow for various coherent integration times for various channel/satellite vehicles thereby providing different frequency resolution in the searches.

The signals after being processed by the signal processor subsystem 204 are passed via RAM (coherent buffer 320 and cross-correlator 314) to the FFT subsystem 206. The cross-correlator 314 may be used to identify despread signals from a weak satellite. The software may save the output of signal processing subsystem 204 and makes it available to the FFT subsystem 206 for further cross correlation processing.

The cross-correlator 314 holds the output of the matched filter 308 in complex form (I,Q) for use by a cross-correlator removal process. In the cross-correlator removal process, some weak signal data from the past is required and strong signal processing is typically completed before the weak signals processing commences. This cross-correlator 314 provides flexibility in allowing for more lag in the strong signal processing than other known approaches.

The coherent buffer 320 may be a first in first out (fifo) buffer that passes blocks of data from the output of a coherent accumulator to the input of the FFT 322. Each block of data in the coherent buffer 320 represents the shortest integrating time in the system and is associated with a scale factor to keep it within eight bits (may be an exponent representation) of the value stored in FIFO1. Normalization may occur between the data stored in the coherent buffer 320 in order to have common scaling between the data supplied to the FFT 322. When operating in a locked mode, the data from the matched filter 308 may be directly feed to the FFT 206.

The coherent buffer 320 holds the output of the matched filter 308 as a complex value (I, Q). The coherent buffer 308 may be shared between channels or may be dedicated under software control. This provides flexibility for optimum use of the memory resources. For example, if the receiver has information that allows processing of only the NCS buffers or peak buffers, then the coherent buffer 320 may be shared between channels resulting in memory resource savings.

The FFT subsystem 206 may include a multiplexer 321 that multiplexes the output of the matched filter 308 and data from the coherent buffer 320 and may be coupled to the FFT 322. The FFT subsystem 206 may also include a second multiplexer 323, a non-coherent summation of the signal magnitude 324, and a sorter block 326. The output of the FFT subsystem 206 may be from the sorter 326 to a detector block 328, from the non-coherent summation of the signal magnitude 324 to the non-coherent RAM memory 332, and from the FFT 322 to the track history in RAM memory 334.

The track history in RAM memory 334 is a channel-dependent buffer that may be generated for each channel. It contains information about the hardware tracking loop and its inputs are a time history. This channel-dependent buffer may be used by software to execute software tracking loop algorithms to compute CNO, loss of lock, and measurements. This information may also be used to run software tracking loops if the system warrants. Thus, the Track history in RAM memory 334 provides flexibility and enables a tradeoff between hardware and software processing for different channels. The track history buffer may be enabled or disabled for various channels independently.

The FFT subsystem 206 is configured to enable short coherent integrations, combine them, and get the effect of doing many times the correlations at different offset frequencies, and avoids having to rerun the signal processing subsystem, thus resulting in a power savings. The FFT 322 may also generate other types of data for use by the SATPS receiver 100, such as, for example, bit-sync and generation of a frequency discriminator for use by the tracking loops.

The detector 328 interfaces with the non-coherent RAM memory 332 and writes the data extracted to RAM memory 330. The non-coherent RAM 332 is a buffer that contains a three dimension histogram of code offset, millisecond offset, and frequency offset that may be resolved by choosing the largest peak in the non-coherent RAM memory 332. Bias removal and scaling also may occur within the data in the non-coherent RAM memory 332.

A list of the largest eight peaks may be stored in memory to aid in selection of the largest peak. In other implementations, different amounts of the peaks may be stored. The list may be implemented as a linked list or other searchable data structure.

The hardware and software tracking loops and acquisition plan 335 resides in the memory subsystem 208 in addition to the track history, bit sync, I/Q phase, and the 100 ms report data in RAM memory 304, 314, 320, 332, and 334. The hardware tracking loops implement simple tracking loop equations in hardware and are controlled by software setting various parameters in the channel records. In some cases of extreme signal conditions (very weak signals or widely varying dynamic conditions), it may be preferable to run more complex signal tracking algorithms as opposed to simple tracking loops. In such cases, the hardware tracking loop will be aided by the software tracking loop to obtain enhanced performance. The capability to have both hardware and software tracking loops provides this flexibility.

The coherent data may be used by software for determining parameter changes in the hardware and software tracking loops. An advantage over the prior art is the ability to access both the coherent data and the phase history data with respect to time. The use of this data enables the SATPS receiver 100 to adjust the processing of the data signals and the data may also act as an indication of the quality of operation of the SATPS receiver 100.

The tracking loops may be split into two components, the first being a hardware tracking loop and the other being a software tracking loop. The hardware tracking loop operates at a high rate of speed. The hardware tracking loop is partially controlled by the NCO and counters. The software tracking loop operates at a lower speed and may use more complicated algorithms than the hardware tracking loop. The hardware tracking loop and software tracking loop make use of parameters contained in the memory subsystem 208. The use of two types of tracking loops enables a level of redundancies and monitoring of the operation of the hardware while increasing the efficiency of the hardware tracking loop based upon the algorithms used by the software tracking loop.

As previously discussed, an area of memory may be divided into channels that are groupings of input signal data. The channels may then be processed by the signal processing subsystem 204 followed by the FFT subsystem 206 sequentially. The signal data is passed between subsystems via the memory subsystem 208. The state of the different channels is contained in the channel state RAM memory 338.

The memory subsystem 208 may further have memory that is rewritable, such as RAM memory, or permanent, such as ROM memory, for storing machine-readable encoded instructions. The term RAM and ROM are used to describe the operation of a type of memory that may be implemented using specific types of memory such as SDRAM, DDR, PROM, EPROM, or EEPROM memory to give but a few examples. The machine-readable instructions are typically encoded as modules that when executed control numerous functions of the SATPS receiver 100 of FIG. 1. Examples of such modules are control loops, expert systems, power control, tracking loops, and types of acquisition. Similarly, other modules may control the different internal and external interfaces and messaging between subsystems and between the SATPS receiver 100 and OEM equipment.

The sequencer subsystem 210 may include a sequencer controller 336 that controls a sequencer that oversees the operation of the signal processing subsystem 204 and another sequencer that oversees the operation of the FFT subsystem 206. Rules are implemented that keep the two sequencers synchronized. The rules are commonly called lapping rules and prevent one sequencer from advancing to another channel before the current sequencer has processed that channel's data. In other implementations, a single sequencer may be implemented to control the separate subsystems.

Figure 4:
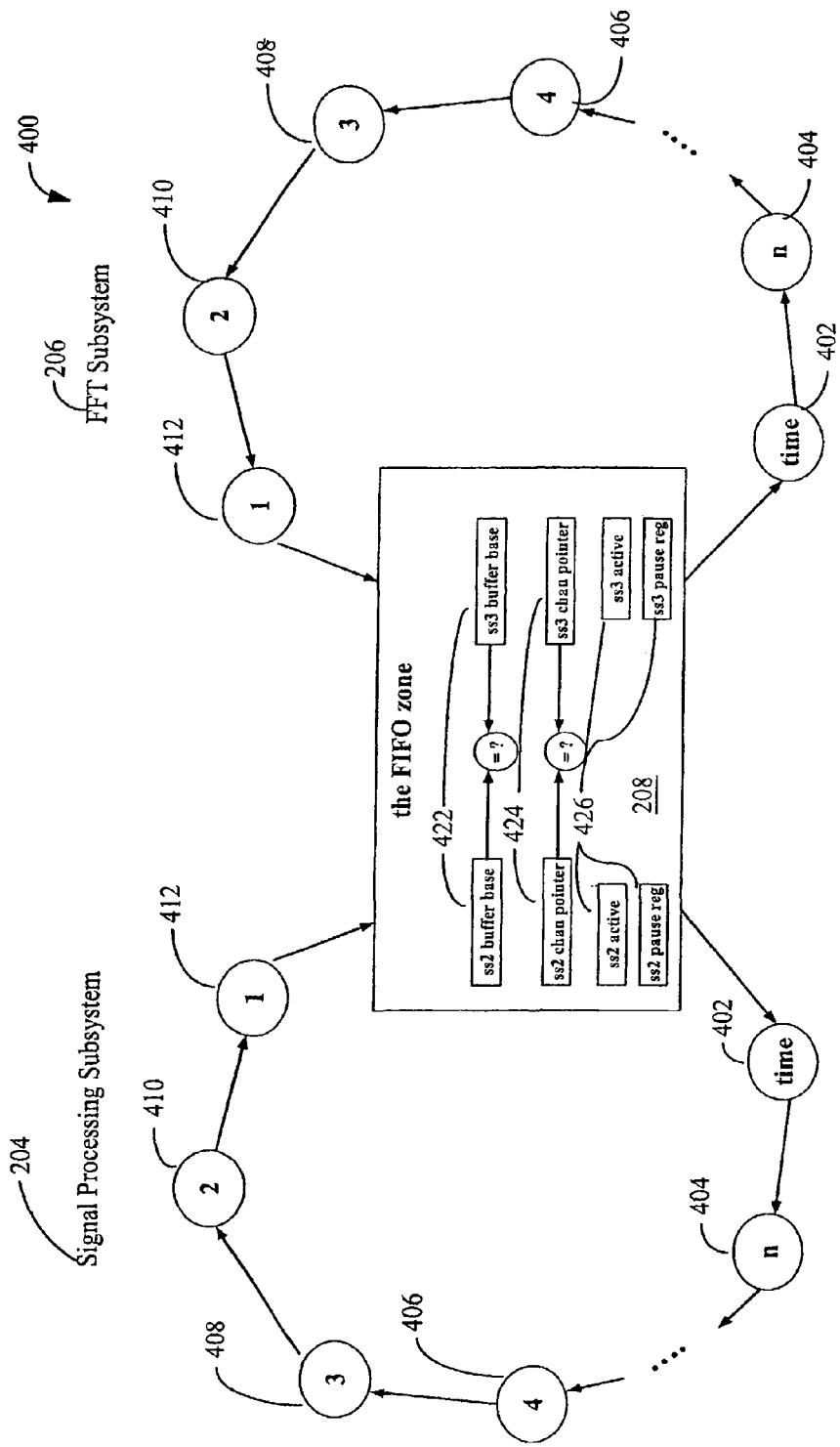
FIG. 4 is a channel sequencing control diagram illustrating the communication between the signal processing subsystem and the FFT subsystem using the memory subsystem and controlled by the timeline manager module.

Turning to FIG. 4, a channel sequencing control diagram 400 illustrating the communication between signal processing subsystem 204 of FIG. 2 and FFT subsystem 206 of FIG. 2, using the memory subsystem 208 of FIG. 2. The signal processing subsystem 204 is shown with a circular link list of input sample buffers or channels 402, 404, 406, 408, 410, and 412. The "FIFO zone" is an area in the memory subsystem 208 that contains the buffer pointers 422 in addition to the registers 426 and pointers 424 used to process data through the signal processing subsystem 204 and the FFT subsystem 204. An area in memory is also allocated for a channel record 420 that contains semaphores associated with the different channels. Similarly, the FFT subsystem 206 executes on the same plurality of channels 402, 404, 406, 408, 410, and 412. The "FIFO zone" 208 also has buffer pointers 422, pointers 424 and registers 426.

The signal processing subsystem 204 processes its associated channels 402, 404, 406, 408, 410, and 412 independently from the FFT subsystem 206. The only requirement is that a channel should be processed by the signal processing subsystem 204 prior to being processed by the FFT 206 subsystem. If the signal processing subsystem 204 gets ahead of the FFT subsystem 206, then data in the channels of the FFT subsystem 206 is overwritten prior to being processed. Therefore, lapping rules are established and implemented in software that prevents a lapping condition for occurring.

The signal processor may be configured to process a circular linked list of channel records, as shown in FIG. 4. The channels may be assigned to perform satellite acquisition, verification, bit synchronization, or tracking. The control of the sequencing operations occurs via three processing threads (signal processing thread, FFT thread, and software thread). These threads each execute independently, but are synchronized by interaction of data flow through the "FIFO zone" 208.

The timeline that is controlled by the signal processor is the processing time of the channels. The software thread in the signal processor has the responsibility to setup and maintain the timeline. The timeline initialization and maintenance may be configured to occur at predetermined periods, such as a 100 ms interrupt rate.

In FIG. 5, an illustration of a diagram 500 of a continuous 32-bit input sample buffer 502 in RAM 304 of FIG. 3 is shown. The 32-bit input sample buffer 502 may be configured to operate in different modes, such as snapshot mode or continuous mode. In snapshot mode, the timeline management is straightforward and always performed for a full C/A code search regardless of the values of pseudorange uncertainty, and the timeline controller or manager may set a parameter for the starting of NCO code phase to an arbitrary value.

When the input sample buffer operates in the input sample buffer snapshot mode, the timeline manager module 214 starts all channels exactly at the beginning of the input sample buffer 502. The size of the input sample buffer 502 should be at least the context time minus one. That is, the number of milliseconds of data to be processed before switching channel minus one millisecond. The timeline manager module 214 should try and keep execution in the same sequential order as requested by the acquisition and tracking module (ATX). Even though a 32-bit sample input buffer is shown, other sample input buffer sizes may be employed.

In the input sample buffer continuous mode, a sample input buffer of 32-bits is employed; a continuous 32-bit count acqcnt is generated and results in a current user time in units of $16f_0$. With the 32-bit input sample buffer 502, a channel record specifies the channel processing start time, in units of $2^{-11}$ chips. In the input sample buffer continuous mode, overflows and underflows may occur.

Two types of overflow and underflow may be detected by the signal processing thread. The first type is tested for at the beginning of a context. The input sample buffer is in an overflow condition when:

Acqcnt[24:12]−codephase[31:19]>(fifo size in units of blocks<<shift).

The input sample buffer is in an underflow condition when:

Acqcnt[24:12]−codephase[31:19]<(margin for turn on time in units of blocks<<shift), where shift is dependent on the data rate of the input buffer (i.e., 2 if $16f_0$, and 1 if $4f_0$).

When a channel overflow is detected, an interrupt is generated and the channel is turned off. But, when a channel underflow is detected, the channel is skipped. If no overflow or underflow is detected for the channel, then there are enough input samples in the input sample buffer 502 for this signal processing of the channel to occur.

The second type is detected with a test that occurs each time a line of samples are read from the input sample buffer 502. The input sample buffer has overflowed when:

Acqcnt[24:5]−codephase[31:12]>((fifo size in units of blocks<<shift)<<7).

The input sample buffer is in an underflow condition when:

Acqcnt[24:5]−codephase[31:12]<((margin for turn on time in units of blocks<<shift)<<7).

When a channel overflow is detected, an interrupt is once again generated, but the channel keeps running until the number of milliseconds of data to be processed are processed. When a channel underflow is detected, that channel will stall until the input sample buffer 502 has additional data. This continues until the entire context time is complete.

As shown, the timeline manager module 214 maintains the timeline to ensure that there is no input sample buffer overflow and the number of concurrent channels and the input sample buffer size determines its performance.

FIG. 6 illustrates a table 600 of Fast Fourier Transfer Modes used by FFT 332 of FIG. 3. The FFT throughput for the different modes of processing may be determined using the formulas in the table shown in FIG. 6, where corrMod is the number of taps, t1cntsize is the number of t1s in a PDI (pre-detection interval), and t1 is the coherent integration time for one FFT input point, and enHalfChip identifies if spacing is a ½ chip or full chip.

FIG. 7 illustrates an ideal timeline 700 for the channel processing of FIG. 4. Assuming that an arbitrary channel start time may be chosen, which is specified by a variable codephase in the channel record, the ideal timeline 700 is that the code phase of channels are distributed in ascending order over the period of context time. The delta time between two consecutive channels is equal to (Tp+Tc) with Tp being channel-processing time in milliseconds, Tc channel switching time in milliseconds, and Ts being always zero.

The codephase value of each channel for the ideal timeline may be computed as $$idealCodePhase(k) = codePhase(chBase) + \sum_{i=0}^{k-1}(T_p^i + T_c^i) - \sum_{i=0}^{chBase-1}(T_p^i + T_c^i) - bias(chBase),$$

where chBase is the base channel the timeline manager module uses to set up the ideal codephase values for the other channels, and bias is the difference between the base channel codephse value and its idealCodePhase value.

To implement the ideal time line 700, the input sample buffer 502 should have enough space to store (endMsec+2+Tp+Tc) milliseconds of data. The (endMsec+2) milliseconds of data is required for (endMsec+1) context time without channel stall. FIG. 8 illustrates the input sample buffer 502 of FIG. 5 with an additional margin portion 802 at the end of the input sample buffer 502. The size of the margin portion 802 may be at least (Tp+Tc) milliseconds, which may be used to store the incoming input samples during a channel processing. It is desirable to set up and maintain the timeline as close to the ideal timeline 700 as possible.

FIG. 9 illustrates the input sample buffer 502 of FIG. 8 with an additional margin portion 902 at the beginning of the input sample buffer. The additional margin portion 902 at the beginning of the input sample buffer enables the timeline manager module to manage the timeline by adjusting context time. Each channel is normally set up to process a number of milliseconds of data, which is specified by the endMsec parameter in the channel record. The channel context time is defined by (endMsec+1) and has a typical value of 4 or 5 milliseconds. The timeline manager module has the capability to adjust endMsec for each of the channels. The deltaEndMsec parameter in the channel record defines the adjustment to endMsec.

The channel context time may be adjusted to maintain the circular linked list so that the codephase in the channel records are as close to the ideal timeline as possible over the period of context time. Since the channel start time may be tied to a satellite code epoch, the code phase in the channel records may not be in ascending order. The deltaEndMsec parameter in each channel record is defined as a signed number, which provides the capability to either increase or decrease the context time once per request per channel. To reduce the input sample buffer size, a minus one-millisecond adjustment may be employed when needed. It is therefore possible, that the codephase in the channel records may not be in ascending order and the input sample buffer would have a beginning margin portion and an end margin portion as shown in FIG. 9.

To support the minus one millisecond adjustment on the context time, the start margin portion 802 should not be less than one millisecond and the end margin portion 902 should be large enough to store the incoming samples during the channel processing, i.e., the margin should be larger than or equal to $\max(T_p^k+T_c^k)$, where superscript k stands for channel k. Therefore the minimum input sample buffer size should be $((endMsec+3)+\max(T_p^k+T_c^k))$.

FIG. 10 is a chart 1000 that illustrates the five types of channel alignment 1002, 1004, 1006, 1008 and 1010. The timeline manager module 214, when starting a channel, computes the desired start time and then sends the desired start time to the timeline manager module 214. It is the timeline manager module's 214 responsibility to start the channels correctly. The timeline manager module 214 determines the actual start time of the channel based on the type of alignment required, the desired start time, and existing timeline. The first type of alignment is the NO_ALIGNMENT 1002 type of alignment and is employed when the full C/A code search is performed and the search does not require NAV bit alignment. The second type of alignment is the 1MS_ALIGNMENT 1004 type and is a one-millisecond alignment when the partial C/A code search is performed and the search does not require NAV bit alignment. The third type of alignment is a PDI_ALIGNMENT 1006 type alignment and is employed when the search requires NAV bit alignment and PDI is less than 20 milliseconds (The PDI is also a factor of 20 milliseconds). The fourth type of alignment is 20MS_ALIGNMENT 1008, and is the twenty milliseconds alignment that is used when NAV bit alignment and PDE are equal to or an integer multiple of 20 milliseconds. The fifth type of alignment is NAVBIT_ALIGNMENT 1010, and is an integer multiple of NAV bits alignment that is used when Nav Bit Aiding is performed by the SATPS receiver 100.

Figure 11:
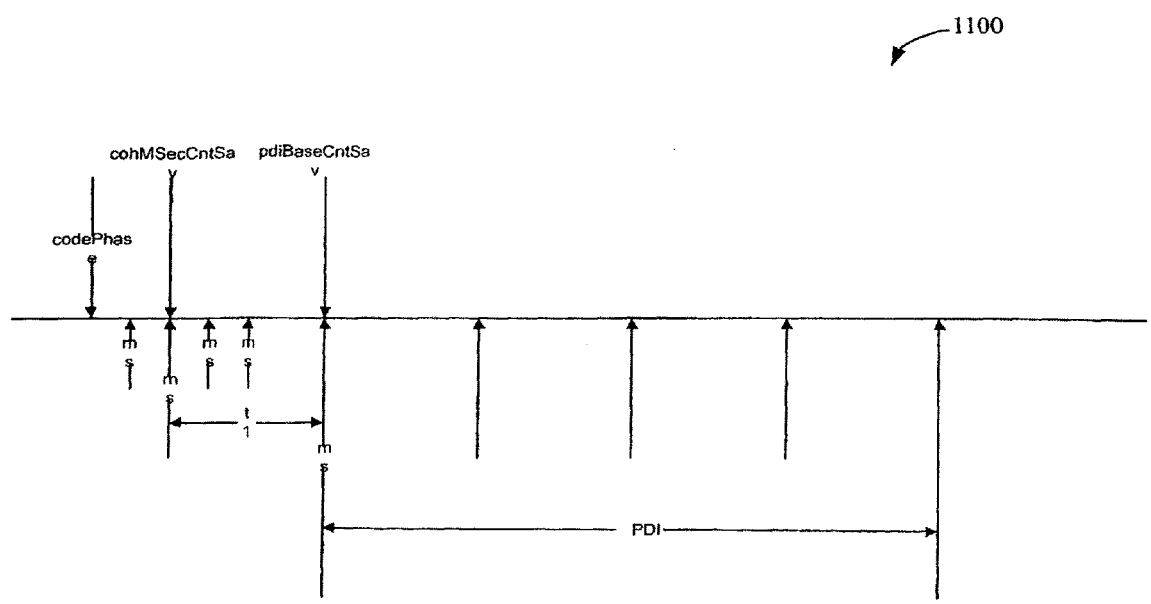
FIG. 11 is a diagram of the relationship of the signal processing subsystem and the FFT subsystem of FIG. 2 and FIG. 4.

FIG. 11 is a diagram 1100 of the relationship of signal processing subsystem 204 and FFT subsystem 206 of FIGS. 2 and 4. The signal processing subsystem starts processing at codePhase and the FFT subsystem starts at pdiBaseCntSay. The data between codePhase and the pdiBaseCntSave may be ignored by the FFT subsystem because it has not started. Once started the FFT subsystem begins processing the data from the channels.

Figure 12:
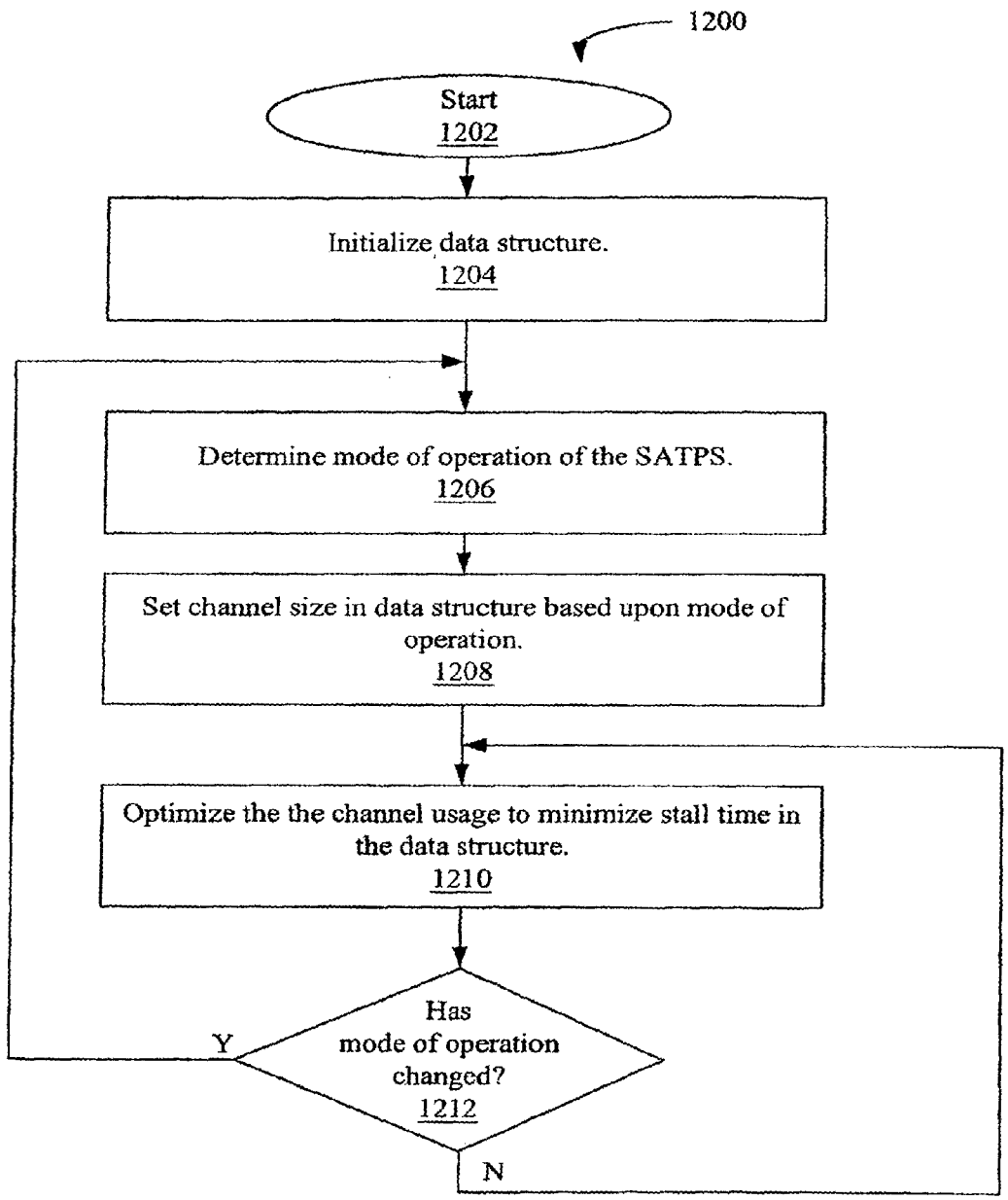
FIG. 12 is an illustration of a flow diagram of the steps executed by the timeline management module of FIG. 4.

FIG. 12 is an illustration of a flow diagram 1200 of the steps of timeline management. The flow diagram 1200 starts 1202 with a circular data structure being initialized in step 1204. The mode of operation of the SATPS receiver 100 is determined in step 1206 and the channel size in the data structure is set or configured in step 1208. In step 1210, the channel usage is optimized as to the arrangement of the data within the channels to minimize the stall time in the data structure and memory. A determination is then made in step 1212, as to the mode of operation of the SATPS receiver 100. If a change in the mode of operation of the SATPS receiver 100 is detected in step 1212, then step 1206 is repeated. Otherwise, no change in the mode of operation of the SATPS receiver 100 has been detected in step 1212 and step 1210 is repeated. This flow may continue until power is removed from the SATPS receiver 100 or until power control shuts down portions of the SATPS receiver 100.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A satellite positioning receiver, comprising:
 a signal processing subsystem;
 a Fast Fourier Transfer (FFT) subsystem;
 a memory that has a plurality of channel records, each channel record corresponding to a respective satellite; and
 a timeline manager module that assigns respective processing times to the plurality of channel records for data flow over a common pipeline between the signal processing subsystem and the FFT subsystem,
 wherein timeline manager module assigns the respective processing times of the plurality of channel records based on a type of alignment defined for each of the plurality of channel records.

2. The satellite positioning receiver of claim 1, wherein the type of alignment for each of the plurality of channel records is defined by a status of signal processing for the satellite corresponding to the channel record.

3. The satellite positioning receiver of claim 1, where a size of each channel record is determined based upon a status of the signal processing for the satellite corresponding to the channel record.

4. The satellite positioning receiver of claim 1, where the timeline manager module assigns a processing start time to each of the plurality of channel records based on the type of alignment, a desired start time for the processing and an existing timeline of processing times for other ones of the plurality of channel records.

5. The satellite positioning receiver of claim 1, where the timeline manager module, signal processing subsystem and FFT subsystem share the memory and the channel record is sequentially processed by the signal processing subsystem and the FFT subsystem.

6. The satellite positioning receiver of claim 1, wherein each channel record is assigned the type of alignment from a plurality of types of alignment including:
   no alignment;
   one millisecond alignment;
   pre-detection interval alignment;
   20 millisecond alignment; and
   navigation bit alignment.

7. A method of timeline management in a satellite positioning receiver, comprising the steps of:
   configuring a plurality of channel records, each corresponding to a respective satellite, in a memory that contains satellite positioning signal data accessed by a signal processing subsystem and a Fast Fourier Transfer (FFT) subsystem over a common pipeline; and
   assigning respective processing times to the plurality of channel records for data flow over the common pipeline between the signal processing subsystem and the FFT subsystem, the processing times being assigned based on a type of alignment defined for each of the plurality of channel records.

8. The method of timeline management of claim 7, wherein the configuring of the plurality of channel records includes:
   determining a signal processing status of each satellite; and
   assigning the type of alignment for each of the plurality of channel records based on the status of signal processing for the satellite corresponding to the channel record.

9. The method of timeline management of claim 7, where configuring the plurality of channel records, further includes the steps of:
   determining a signal processing status of each satellite; and
   setting a size of the channel record corresponding to the satellite is based upon the signal processing status.

10. The method of timeline management of claim 7, wherein assigning respective processing times to the plurality of channel records includes assigning a start time to each of the plurality of channel records based on the type of alignment, a desired start time for the processing and an existing time line of processing times for other ones of the plurality of channel records.

11. The method of timeline management of claim 7, further including:
   assigning the type of alignment for each of the plurality of channel records from a group of alignment types consisting of:
   no alignment;
   one millisecond alignment;
   pre-detection interval alignment;
   20 millisecond alignment; and
   navigation bit alignment.

12. A non-transient computer-readable storage medium storing instructions that, upon execution by a processor, cause the method of timeline management in a satellite positioning receiver to occur, the medium having stored instructions that cause the system processor to perform steps comprising:
   configuring a plurality of channel records, each corresponding to a respective satellite, in a memory that contains satellite positioning signal data accessed by a signal processing subsystem and a Fast Fourier Transfer (FFT) subsystem over a common pipeline; and
   assigning respective processing times to the plurality of channel records for data flow over the common pipeline between the signal processing subsystem and the FFT subsystem, the processing times being assigned based on a type of alignment defined for each of the plurality of channel records.

13. The non-transient computer-readable storage medium of claim 12, where configuring the plurality of channel records further includes:
   determining a signal processing status of each satellite; and
   assigning the type of alignment for each of the plurality of channel records based on the status of signal processing for the satellite corresponding to the channel record.

14. The non-transient computer-readable storage medium of claim 12, where configuring the plurality of channel records further includes:
   determining a signal processing status of each satellite; and
   setting a size of the channel record corresponding to the satellite is based upon the signal processing status.

15. The non-transient computer-readable storage medium of claim 12, where assigning respective times to the plurality of channel records includes assigning a start time to each of the plurality of channel records based on the type of alignment, a desired start time for the processing and an existing time line of processing times for other ones of the plurality of channel records.

16. The non-transient computer-readable storage medium of claim 12, further including instructions that cause the processor to perform the step of assigning the type of alignment for each of the plurality of channel records from a group of alignment types consisting of:
   no alignment;
   one millisecond alignment;
   pre-detection interval alignment;
   20 millisecond alignment; and
   navigation bit alignment.

* * * * *

UNITED STATES PATENT AND TRADEMARK OFFICE
CERTIFICATE OF CORRECTION

PATENT NO. : 8,810,450 B2
APPLICATION NO. : 13/435687
DATED : August 19, 2014
INVENTOR(S) : Zhang et al.

It is certified that error appears in the above-identified patent and that said Letters Patent is hereby corrected as shown below:

In the Specification

In Column 7, Line 13, delete "coherent buffer 308" and insert -- coherent buffer 320 --, therefor.

In Column 9, Lines 5-6, delete "FFT subsystem 204." and insert -- FFT subsystem 206. --, therefor.

In Column 11, Line 4, delete "codephse" and insert -- codephase --, therefor.

In Column 12, Line 6, delete "PDE" and insert -- PDI --, therefor.

Signed and Sealed this
Tenth Day of February, 2015

Michelle K. Lee
*Deputy Director of the United States Patent and Trademark Office*